United States Patent
Tan et al.

(10) Patent No.: US 8,215,294 B2
(45) Date of Patent: Jul. 10, 2012

(54) METHOD AND SYSTEM FOR CONTROLLING AN ENGINE DURING DIESEL PARTICULATE FILTER REGENERATION WARM-UP

(75) Inventors: Julian C. Tan, Canton, MI (US); John Zeilstra, Chicago, IL (US); Christoph Thoele, Holdorf (DE); Gustavo Tepedino, Ann Arbor, MI (US)

(73) Assignee: GM Global Technology Operations LLC

( * ) Notice: Subject to any disclaimer, the term of this patent is extended or adjusted under 35 U.S.C. 154(b) by 282 days.

(21) Appl. No.: 12/683,048

(22) Filed: Jan. 6, 2010

(65) Prior Publication Data

US 2011/0162629 A1 Jul. 7, 2011

(51) Int. Cl.
*F02D 41/00* (2006.01)

(52) U.S. Cl. ........... 123/681; 123/683; 123/687; 60/295

(58) Field of Classification Search ................... 123/674, 123/676, 680–683, 687, 703; 60/274, 276, 60/285–286, 295
See application file for complete search history.

(56) References Cited

U.S. PATENT DOCUMENTS

| | | | | |
|---|---|---|---|---|
| 6,497,095 | B2 * | 12/2002 | Carberry et al. | 60/295 |
| 7,137,246 | B2 * | 11/2006 | van Nieuwstadt et al. | 60/295 |
| 7,275,365 | B2 * | 10/2007 | Zhan et al. | 60/295 |
| 7,478,528 | B2 * | 1/2009 | Ament et al. | 60/295 |
| 7,610,753 | B2 * | 11/2009 | Kitahara | 60/295 |
| 7,992,381 | B2 * | 8/2011 | Sugiarto et al. | 60/295 |
| 2004/0194450 | A1 * | 10/2004 | Tanaka et al. | 60/285 |
| 2008/0060350 | A1 * | 3/2008 | Ament et al. | 60/295 |
| 2010/0275582 | A1 * | 11/2010 | Wada et al. | 60/276 |
| 2011/0023590 | A1 * | 2/2011 | Van Nieuwstadt et al. | 73/114.73 |
| 2011/0041476 | A1 * | 2/2011 | Zanetti et al. | 60/273 |
| 2011/0209463 | A1 * | 9/2011 | Tan et al. | 60/285 |

FOREIGN PATENT DOCUMENTS

JP 2008-128174 * 6/2008

* cited by examiner

*Primary Examiner* — Hai Huynh

(57) ABSTRACT

A method and control system for controlling an engine during diesel particulate filter regeneration includes a diesel particulate filter (DPF) regeneration request module that generates a DPF regeneration request signal. The control system also includes a DPF regeneration control module that controls the oxygen level in the exhaust based on an oxygen level signal corresponding to an oxygen level in the exhaust and a DPF inlet temperature signal corresponding to the DPF inlet temperature.

20 Claims, 4 Drawing Sheets

METHOD AND SYSTEM FOR CONTROLLING AN ENGINE DURING DIESEL PARTICULATE FILTER REGENERATION WARM-UP

FIELD

The present disclosure relates to vehicle exhaust systems and, more particularly, to controlling the warm-up of a diesel particulate filter (DPF) during regeneration.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engine operation involves combustion that generates exhaust gas. During combustion, an air/fuel mixture is delivered through an intake valve to cylinders and is combusted therein. After combustion, the piston forces the exhaust gas in the cylinders into an exhaust system. The exhaust gas may contain emissions such as oxides of nitrogen ($NO_x$) and carbon monoxide (CO).

More and more exhaust hardware technology is being added to meet emissions on diesel applications. After treatment of exhaust gases includes the installation of multiple bricks, mixers and injectors for the exhaust stream. A diesel particulate filter is regenerated periodically to reduce the amount of soot therein. The speed at which a diesel particulate filter inlet exhaust gas temperature increases can create a DPF ring-off failure if the inlet exhaust gas temperature rises too quickly. If the inlet exhaust gas temperature rises too slowly, the diesel particulate filter regeneration duration is increased, which may reduce fuel economy.

SUMMARY

Accordingly, the present disclosure provides for a system and method for controlling the diesel particulate filter regeneration warm-up rate to improve the regeneration efficiency by controlling the amount of exhaust gas oxygen.

In one aspect of the disclosure, a control module includes a diesel particulate filter (DPF) regeneration request module that generates a DPF regeneration request signal. The control system also includes a DPF regeneration control module that controls the oxygen level in the exhaust based on an oxygen level signal corresponding to an oxygen level in the exhaust and a DPF inlet temperature signal corresponding to the DPF inlet temperature.

In another aspect of the disclosure, a method includes entering a diesel particulate filter (DPF) regeneration cycle, entering a diesel particulate filter (DPF) regeneration cycle, generating an oxygen level signal corresponding to an oxygen level in the exhaust, generating a DPF inlet temperature signal corresponding to the DPF inlet temperature and controlling the oxygen level in the exhaust based on the oxygen level signal and the inlet temperature.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
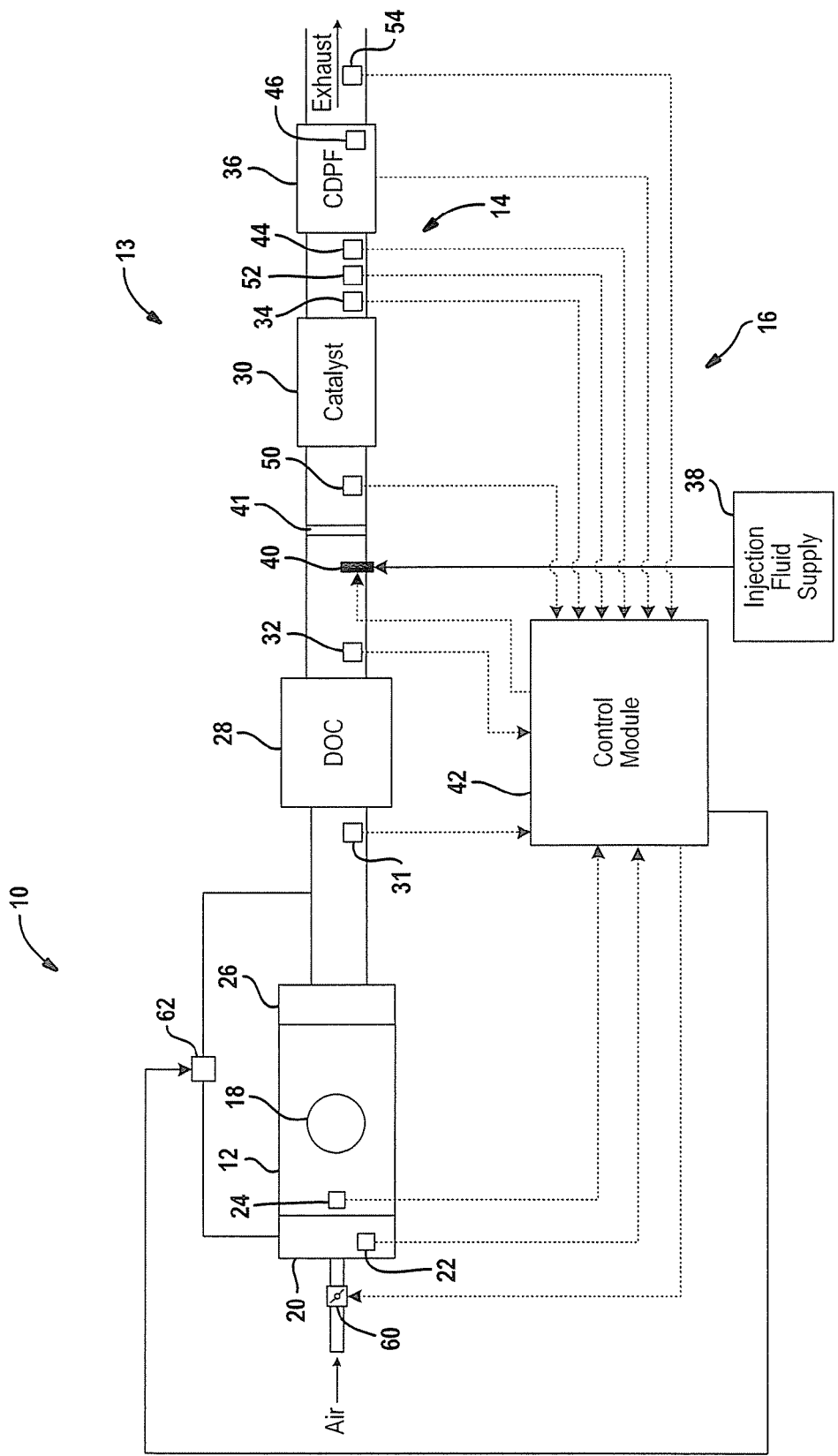
FIG. 1 is a functional block diagram of an engine system including an exhaust treatment system with temperature sensors integrated within a catalyst according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the following disclosure is set forth for diesel engines, other types of engines such as gasoline engines, including direct injection engines, may benefit from the teachings herein.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before releasing the exhaust gas to the atmosphere. The exhaust system 14 includes an exhaust manifold 26 and a diesel oxidation catalyst (DOC) 28. The exhaust manifold 26 directs exhaust exiting the cylinder towards the DOC 28. The exhaust is treated within the DOC 28 to reduce the emissions. The exhaust system 14 further includes a catalyst 30, such as a selective catalyst reducing (SCR) catalyst, a temperature sensor 31, an inlet temperature sensor 32, an outlet temperature sensor 34 and catalyzed diesel particulate filter (CDPF) 36. The DOC 28 reacts with the exhaust gas prior to treating the exhaust to reduce emission levels of the exhaust. The catalyst 30 reacts subsequent to treating the exhaust to further reduce emissions.

The temperature sensor 31 may be positioned between the engine and the DOC 28. The inlet temperature sensor 32 is located prior to the catalyst 30 to monitor the temperature change at the inlet of the catalyst 30, as discussed further below. The outlet temperature sensor 34 is located after the catalyst to monitor the temperature change at the outlet of the catalyst 30, as discussed further below. Although the exhaust treatment system 13 is illustrated as including the inlet and outlet temperature sensors 32, 34 as being outside the catalyst 30, the inlet and outlet temperature sensors 32, 34 can be located internally with the catalyst to monitor the temperature change of the exhaust at the inlet and outlet of the catalyst. The CDPF 36 further reduces emissions by trapping diesel particulates (i.e., soot) within the exhaust.

The dosing system 16 includes an injection fluid supply 38 that may be used for injecting urea from a tank and a dosing injector 40. The dosing system 16 injects injection fluid such as urea into the exhaust. The urea mixes with the exhaust and further reduces the emissions when the exhaust/urea mixture is exposed to the catalyst 30. A mixer 41 is used to mix the injection fluid such as urea with the exhaust gasses prior to the exhaust gases entering the catalyst.

A control module 42 regulates and controls the operation of the engine system 10 and monitors operation of the dosing system 16.

An exhaust gas flow rate sensor 44 may generate a signal corresponding to the flow of exhaust in the exhaust system. Although the sensor is illustrated between the catalyst 30 and the CDPF 36 various locations within the exhaust system may be used for measurement including after the exhaust manifold and before the catalyst 30.

A temperature sensor 46 generates a particulate filter temperature sensor signal that corresponds to a measured particulate filter temperature. The temperature sensor 46 may be disposed on or within the diesel particulate filter 36. The temperature sensor 46 may also be located just after or just before the diesel particulate filter relative to the exhaust stream. The temperature sensor 46 communicates a measured particulate filter temperature signal to the control module 42.

Other sensors in the exhaust system may include an oxygen sensor 50 which generates an oxygen level signal corresponding to the level of oxygen in the exhaust gasses within exhaust system. The oxygen sensor may be a lambda sensor or another type of sensor generating a signal corresponding to the level of oxygen in the exhaust gasses. A NOx-Out sensor 52 (sensor 52 should be located between 34 and 44) may be positioned downstream such as after the SCR 30 for generating a signal corresponding to the oxides of nitrogen leaving the SCR. In addition, an ammonia ($NH_3$) sensor 54 generates a signal corresponding to the amount of ammonia within the exhaust stream.

The control module 42 may be used to control an electronic throttle 60 and an exhaust gas recirculation (EGR) valve 62 that recirculates exhaust gases into the intake manifold 20. The electronic throttle 60 and EGR valve 62 may be controlled to change the oxygen level in the exhaust gases.

The control module 42 may control the exhaust conditions and regeneration of the diesel particulate filter. Further details of the control module 42 and the exhaust control module 60 are provided below.

Figure 2:
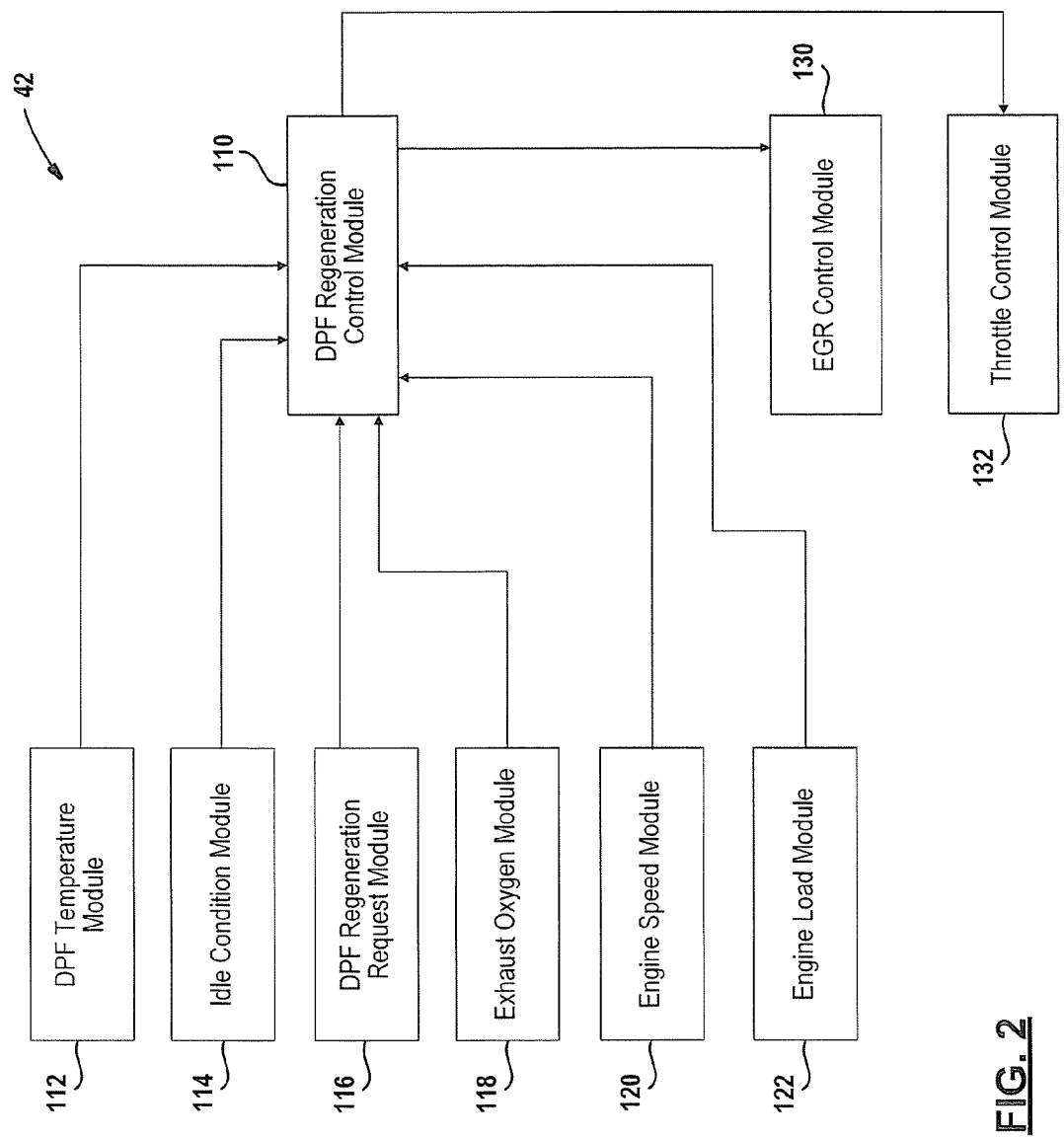
FIG. 2 is a functional block diagram of the controller of FIG. 1.

Referring now to FIG. 2, the control module 42 may include a diesel particulate filter (DPF) regeneration control module 110. The DPF regeneration control module 110 may receive signals from various other modules. The DPF regeneration control module 110 may receive a temperature signal from a DPF temperature module 112. The DPF temperature module 112 may generate a temperature signal corresponding to the input temperature of the diesel particulate filter. The temperature signal may also be generated based upon an estimate of the engine operating conditions.

An idle condition module 114 may also be in communication with the diesel particulate filter regeneration control module 110. The idle condition module 114 may generate a signal corresponding to whether the engine is at an idle condition. The engine may be at an idle condition when the vehicle is in park or neutral. The engine may also be in idle condition when the vehicle is stopped. The teaching set forth herein is performed when the vehicle is not idling and the DPF input temperature is below a DPF warm-up temperature.

A diesel particulate filter (DPF) regeneration request module 116 may generate a DPF regeneration request signal. The DPF regeneration request signal may be communicated to the DPF regeneration control module 110. The DPF regeneration signal may initiate diesel particulate filter regeneration.

An exhaust oxygen module 118 generates an exhaust oxygen signal corresponding to the amount of exhaust oxygen within the exhaust system. The exhaust oxygen signal may be generated from a lambda sensor or another type of oxygen sensor. The exhaust oxygen signal from the exhaust oxygen module 118 is communicated to the diesel particulate filter regeneration control module 110.

An engine speed module 120 generates an engine speed signal corresponding to the rotational speed of the engine. The engine speed module 120 may receive a signal corresponding to the crankshaft speed or other speed sensor within the engine. The engine speed signal may also be generated from various other types of sensors including a transmission input sensor or other sensors from within the vehicle.

An engine load module 122 communicates an engine load signal to the DPF regeneration control module 110. The engine load module 122 generates a signal corresponding to the amount of load on the engine. The engine load may be measured by the amount of torque of the engine. The engine torque may be measured by sensors or calculated based upon the engine operating conditions.

The DPF regeneration control module 110 may be in communication with various other engine components such as the EGR control module 130 and the throttle control module 132. The idle condition module 114 may generate control signals to obtain a predetermined amount of engine exhaust oxygen to allow the DPF catalyst to controllable warm-up. Both the EGR control module 130 and the throttle control module 132 may be controlled to control the amount of engine exhaust oxygen. Of course, other vehicle components may be used to control the exhaust gas oxygen.

Figure 3:
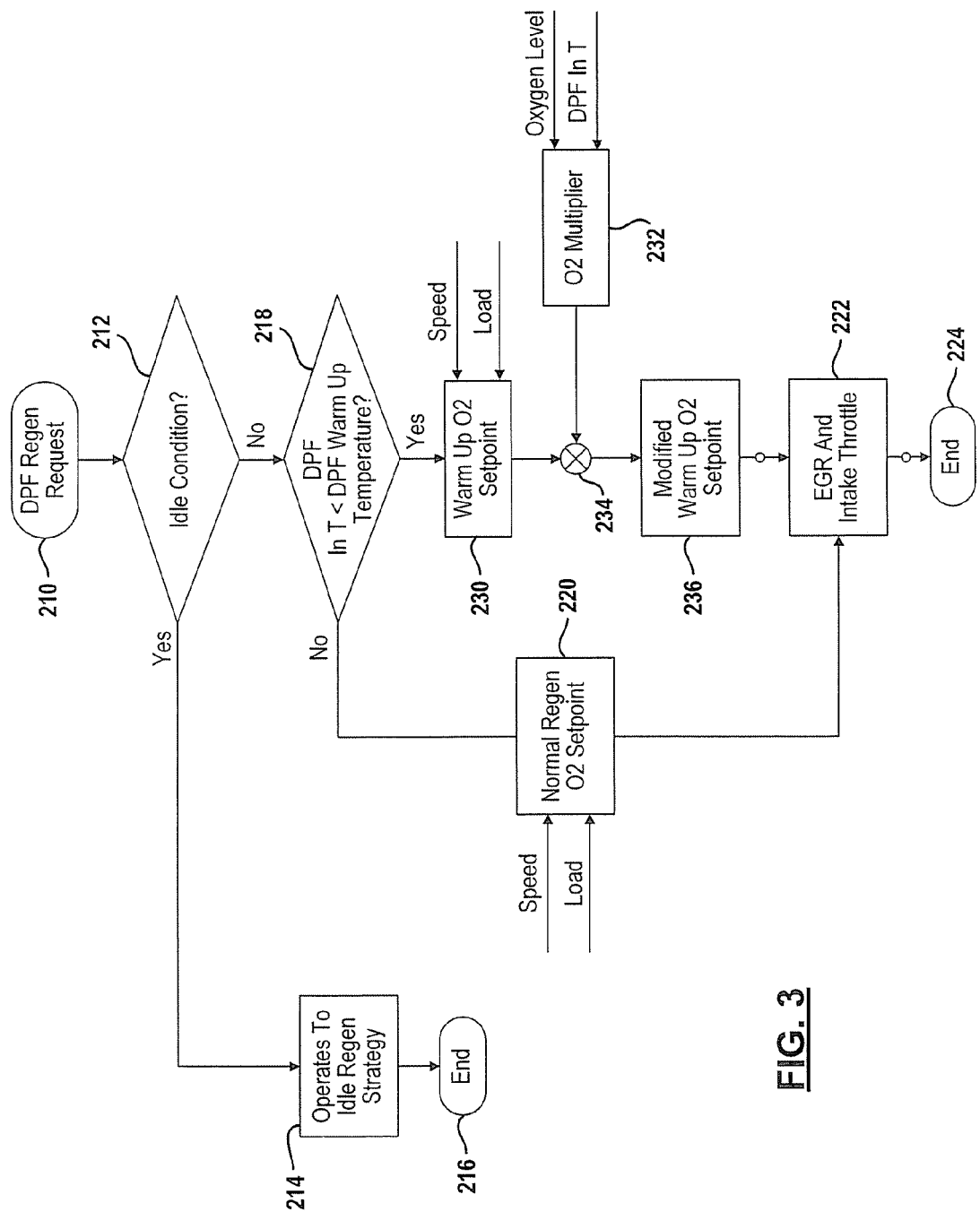
FIG. 3 is a flowchart of a method for controlling the system.

Referring now to FIG. 3, a method for controlling the regeneration is set forth. In step 210, a diesel particulate filter regeneration request is generated. Various conditions such as soot buildup may necessitate regeneration. In step 212, it is determined whether the engine is in an idle condition. If the engine is in an idle condition, step 214 operates the engine in an idle regeneration strategy. In step 216, the method ends.

Referring back to step 212, when the engine is not operating in an idle condition, step 218 compares the diesel particulate filter input temperature to a diesel particulate filter warm-up temperature. When the diesel particulate filter input temperature is not less than the diesel particulate filter warm-up temperature, step 220 activates a normal regeneration process and sets an oxygen set point based upon engine speed and engine load. After step 220, the EGR and intake throttle are controlled in step 222 to obtain the set oxygen level. After step 222, the system ends in step 224.

Referring back to step 218, when the diesel particulate filter input temperature is less than the diesel particulate filter warm-up temperature, step 230 is performed. In step 230, a warm-up oxygen set point is determined based upon speed and load of the engine. In step 232, an oxygen multiplier is determined based upon the oxygen level determined and the diesel particulate filter input temperature. The multiplier in step 232 allows the temperature to rapidly increase to near a pre-determined temperature without overshooting the temperature and stressing the diesel particulate filter.

After step 232, the warm-up oxygen set point and the oxygen multiplier are combined at block 234. Block 234 may be a multiplication block or other block capable of combining the two signals. The combined signal may adjust the speed of the warm-up or slope of the temperature signal.

In step 236, a modified warm-up oxygen set point is determined based upon the oxygen multiplier and the warm-up oxygen set point. After step 236, the EGR and intake throttle are controlled in step 232 according to the modified warm-up oxygen set point determined in step 236.

Figure 4:
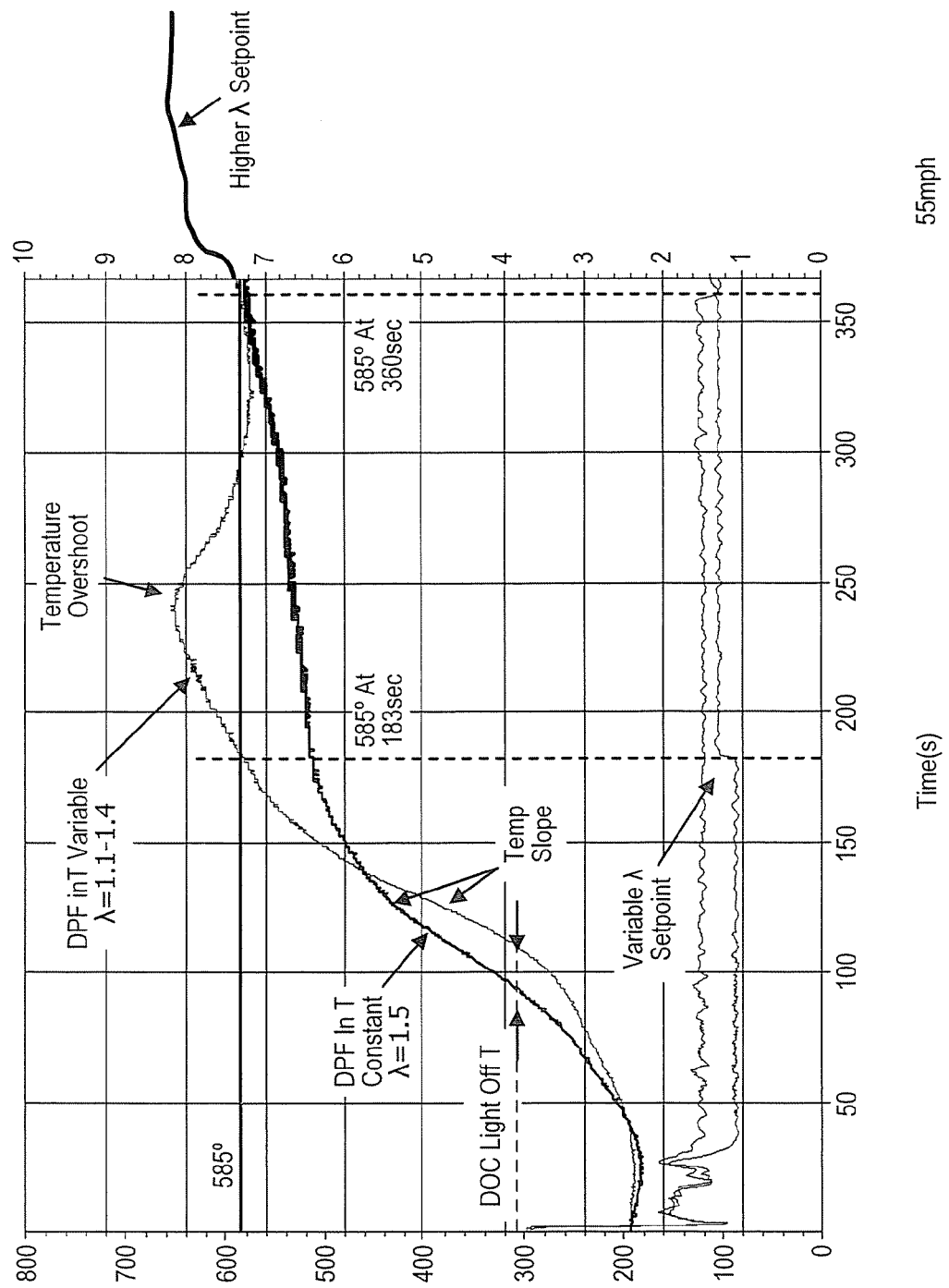
FIG. 4 is a plot of the temperature input to the diesel particulate filter versus time for controlled warm-up verse uncontrolled warm-up.

Referring now to FIG. 4, a plot of a diesel particulate filter temperature using two different lambdas is illustrated. The diesel particulate filter input temperature at a lambda of between 1.1 and 1.4 overshoots the desired temperature after a pre-determined amount of time. This overshooting of the temperature may stress the diesel particulate filter and reduce the life thereof. The DPF input temperature with a lambda of 1.5 is also illustrated. The diesel oxidation catalyst light-off temperature is illustrated at around 300° C. By controlling the amount of oxygen, the slope of the temperature signals may be controlled to prevent damage to the diesel particulate filter.

By controlling the exhaust oxygen level, the customer experience is improved by reducing the preventing the DPF from warming too fast, and preventing the DPF from warming too slowly. This may increase fuel economy of the vehicle.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   initiating a regeneration cycle of a diesel particulate filter (DPF);
   generating an oxygen level signal corresponding to an oxygen level in exhaust input to the DPF;
   generating a DPF inlet temperature signal corresponding to a DPF inlet temperature;
   in response to a first determination that an engine is not idling and a second determination that the DPF inlet temperature is less than a predetermined temperature, determining an oxygen level setpoint for the regeneration cycle based on the oxygen level and the DPF inlet temperature; and
   controlling the oxygen level in the exhaust based on the oxygen level setpoint during the regeneration cycle.

2. A method as recited in claim 1 further comprising, in response to the first and second determinations, determining the oxygen level setpoint for the regeneration cycle further based on an engine speed and an engine load.

3. A method as recited in claim 1 further comprising, in response to the first and second determinations:
   determining a first oxygen level setpoint as a function of engine speed and engine load;
   determining a multiplier as a function of the DPF inlet temperature and the oxygen level; and
   determining the oxygen level setpoint as a function of the first oxygen level setpoint and the multiplier.

4. A method as recited in claim 1 further comprising, in response to at least one of a determination that the engine is idling and a determination that the DPF inlet temperature is greater than the predetermined temperature:
   determining a second oxygen level setpoint for the regeneration cycle independent of the oxygen level and the DPF inlet temperature; and
   controlling the oxygen level in the exhaust based on the second oxygen level setpoint during the regeneration cycle.

5. A method as recited in claim 1 wherein generating an oxygen level signal comprises generating the oxygen level signal based on an engine load.

6. A method as recited in claim 1 wherein generating an oxygen level signal comprises generating the oxygen level signal based on an engine speed.

7. A method as recited in claim 1 wherein generating an oxygen level signal comprises generating the oxygen level signal based on an engine load and engine speed.

8. A method as recited in claim 1 wherein controlling the oxygen level comprises controlling exhaust gas recirculation.

9. A method as recited in claim 1 wherein controlling the oxygen level comprises controlling intake throttle.

10. A method as recited in claim 1 wherein controlling the oxygen level comprises controlling intake throttle and exhaust gas recirculation.

11. A control module for an engine comprising:
    a diesel particulate filter (DPF) regeneration request module that generates a DPF regeneration request signal for initiating a regeneration cycle of a DPF; and
    a DPF regeneration control module that, in response to a first determination that the engine is not idling and a second determination that a DPF inlet temperature is less than a predetermined temperature:
    determines an oxygen level setpoint for the regeneration cycle based on an oxygen level in exhaust input to the DPF and the DPF inlet temperature; and
    controls the oxygen level in an exhaust based on the oxygen level setpoint during the regeneration cycle.

12. A control module as recited in claim 11 wherein the DPF regeneration control module, in response to the first and second determinations, determines the oxygen level setpoint for the regeneration cycle further based on an engine speed and an engine load.

13. A control module as recited in claim 11 wherein the DPF regeneration control module, in response to the first and second determinations:
    determines a first oxygen level setpoint as a function of engine speed and engine load;
    determines a multiplier as a function of the DPF inlet temperature and the oxygen level; and
    determines the oxygen level setpoint as a function of the first oxygen level setpoint and the multiplier.

14. A control module as recited in claim 11 wherein, in response to at least one of a determination that the engine is idling and a determination that the DPF inlet temperature is greater than the predetermined temperature, the DPF regeneration control module:
    determines a second oxygen level setpoint for the regeneration cycle independent of the oxygen level and the DPF inlet temperature; and
    controls the oxygen level in the exhaust based on the second oxygen level setpoint during the regeneration cycle.

15. A control module as recited in claim 11 wherein the oxygen level is generated based on an engine load.

16. A control module as recited in claim 11 wherein the oxygen level is generated based on an engine speed.

17. A control module as recited in claim 11 wherein the oxygen level is generated based on an engine load and engine speed.

18. A control module as recited in claim 11 wherein an exhaust gas recirculation control module controls exhaust gas recirculation to control the oxygen level in the exhaust.

19. A control module as recited in claim 11 wherein a throttle control module controls an intake throttle to control the oxygen level in the exhaust.

20. A control module as recited in claim 11 wherein an exhaust gas recirculation control module controls exhaust gas recirculation and a throttle control module controls an intake throttle to control the oxygen level in the exhaust.

* * * * *